US012657814B2

(12) United States Patent
Li et al.

(10) Patent No.: US 12,657,814 B2
(45) Date of Patent: Jun. 16, 2026

(54) DYNAMIC FLUID EFFECT PROCESSING METHOD AND APPARATUS, AND ELECTRONIC DEVICE AND READABLE MEDIUM

(71) Applicant: Beijing Bytedance Network Technology Co., Ltd., Beijing (CN)

(72) Inventors: Qi Li, Beijing (CN); Xiaoqi Li, Beijing (CN)

( * ) Notice: Subject to any disclaimer, the term of this patent is extended or adjusted under 35 U.S.C. 154(b) by 671 days.

(21) Appl. No.: 18/040,937

(22) PCT Filed: Aug. 9, 2021

(86) PCT No.: PCT/CN2021/111607
§ 371 (c)(1),
(2) Date: Feb. 7, 2023

(87) PCT Pub. No.: WO2022/033444
PCT Pub. Date: Feb. 17, 2022

(65) Prior Publication Data
US 2023/0298265 A1 Sep. 21, 2023

(30) Foreign Application Priority Data

Aug. 10, 2020 (CN) .......................... 202010797808.2

(51) Int. Cl.
*G06K 9/00* (2022.01)
*G06T 7/579* (2017.01)
*G06T 17/00* (2006.01)

(52) U.S. Cl.
CPC .............. *G06T 17/00* (2013.01); *G06T 7/579* (2017.01); *G06T 2207/10* (2013.01)

(58) Field of Classification Search
CPC ..... G06T 17/00; G06T 2207/10; G06T 7/579; G06T 13/20; G06F 2111/10;
(Continued)

(56) References Cited

U.S. PATENT DOCUMENTS

2007/0250296 A1* 10/2007 Shima ..................... G01W 1/14
703/2
2010/0094608 A1* 4/2010 Oh .......................... G06F 30/20
703/9
(Continued)

FOREIGN PATENT DOCUMENTS

CN 101329772 A * 12/2008 ............. G06T 17/00
CN 102708227 A 10/2012
(Continued)

OTHER PUBLICATIONS

ISA China National Intellectual Property Administration, Written Opinion for International Application No. PCT/CN2021/111607, mailed Nov. 10, 2021, 7 Pages.
(Continued)

*Primary Examiner* — Avinash Yentrapati
(74) *Attorney, Agent, or Firm* — Alleman Hall LLP

(57) ABSTRACT

A method and apparatus for simulating a dynamic fluid effect, an electronic device, and a readable medium are provided. With the method, a first object and a fluid are displayed on a user display interface, a position of each of model particles in an object model corresponding to the first object is acquired, and a position of each of fluid particles corresponding to the fluid is acquired. When the first object collides with the fluid, for each of the fluid particles, the position of the fluid particle is adjusted based on a position of a model particle that collides with the fluid particle, to dynamically display a motion change of the fluid on the user display interface.

11 Claims, 3 Drawing Sheets

(58) Field of Classification Search
CPC .. G06F 2113/08; G06F 2119/14; G06F 30/25;
G06F 30/28
See application file for complete search history.

(56) References Cited

U.S. PATENT DOCUMENTS

| | | | | |
|---|---|---|---|---|
| 2010/0185420 A1* | 7/2010 | Ding | .................. | G06F 30/23 |
| | | | | 703/2 |
| 2012/0284002 A1* | 11/2012 | McDaniel | ............. | G06F 30/20 |
| | | | | 703/2 |
| 2012/0330628 A1* | 12/2012 | McDaniel | ............. | G06T 13/20 |
| | | | | 703/2 |
| 2021/0158603 A1* | 5/2021 | Tumanov | ............... | G06F 30/25 |
| 2021/0272378 A1* | 9/2021 | Stomakhin | ............. | G06T 19/20 |

FOREIGN PATENT DOCUMENTS

| | | |
|---|---|---|
| CN | 103699715 A | 4/2014 |
| CN | 104268943 A | 1/2015 |
| CN | 104991999 A | 10/2015 |
| CN | 107918949 A | 4/2018 |
| CN | 110969687 A | 4/2020 |

OTHER PUBLICATIONS

ISA China National Intellectual Property Administration, International Search Report Issued in Application No. PCT/CN2021/111607, Nov. 10, 2021, WIPO, 7 pages. (Submitted with partial English translation.).
China National Intellectual Property Administration, Office Action Issued in Application No. 202010797808.2, Jan. 6, 2025, 14 pages.

* cited by examiner

1

DYNAMIC FLUID EFFECT PROCESSING METHOD AND APPARATUS, AND ELECTRONIC DEVICE AND READABLE MEDIUM

CROSS-REFERENCE TO RELATED APPLICATIONS

The present application is the national phase application of International Patent Application No. PCT/CN2021/111607, titled "DYNAMIC FLUID EFFECT PROCESSING METHOD AND APPARATUS, AND ELECTRONIC DEVICE AND READABLE MEDIUM", filed on Aug. 9, 2021, which claims priority to Chinese Patent Application No. 202010797808.2, titled "DYNAMIC FLUID EFFECT PROCESSING METHOD AND APPARATUS, AND ELECTRONIC DEVICE AND READABLE MEDIUM", filed on Aug. 10, 2020 with the National Intellectual Property Administration, PRC, both of which are which incorporated herein by reference in their entireties.

FIELD

The present disclosure relates to the technical field of computers, and in particular to a method and apparatus for simulating a dynamic fluid effect, an electric device, and a computer-readable storage medium.

BACKGROUND

Computer Graphics (CG) is a scientific method of converting, by using mathematical algorithms, a two-dimensional or three-dimensional graphics into a grid form that is suitable for a computer display. That is, the Computer Graphics mainly research on content of how to represent graphics in computers and calculate on graphics by using computers, and the principles and algorithms related to process and display.

Fluid simulation based on physics animation is an important research area in the Computer Graphics. Position Based Fluids (PBF) simulation is widely used in three-dimensional fluid simulation due to its advantages of unconditional stability and large time step size. In the PBF simulation, a collision between a fluid and a rigid body is usually realized by using signed distance functions (SDF). However, with this method, it is required to calculate the SDF of a rigid body model in the three-dimensional space, the calculation is complicated and occupies a large amount of video memory. Moreover, when the rigid body model moves, it is required to recalculate the SDF of the model, which takes a long time. Since the computing and storage resources on the mobile terminal are very limited, the method usually cannot meet the resource requirements and real-time requirements of the mobile terminal when the method is applied to the mobile terminal.

SUMMARY

A method and apparatus for simulating a dynamic fluid effect, an electronic device and a readable medium are provided according to the present disclosure, to solve the problems in the conventional art.

In a first aspect, a method for simulating a dynamic fluid effect is provided, which includes:

displaying a first object and a fluid on a user display interface;

acquiring a position of each of model particles in an object model corresponding to the first object;

acquiring a position of each of fluid particles corresponding to the fluid; and adjusting, for each of the fluid particles, the position of the fluid particle based on a position of a model particle that collides with the fluid particle when the first object collides with the fluid, to dynamically display a motion change of the fluid on the user display interface.

In a second aspect, an apparatus for simulating a dynamic fluid effect is provided, which includes: a display module, a first acquisition module, a second acquisition module, and a position adjustment module. The display module is configured to display a first object and a fluid on a user display interface. The first acquisition module is configured to acquire a position of each of model particles in an object model corresponding to the first object. The second acquisition module is configured to acquire a position of each of fluid particles corresponding to the fluid. The position adjustment module is configured to adjust, for each of the fluid particles, the position of the fluid particle based on a position of a model particle that collides with the fluid particle when the first object collides with the fluid, to dynamically display a motion change of the fluid on the user display interface.

In a third aspect, an electronic device is provided according to the present disclosure, which includes: one or more processors; and a memory. The memory stores one or more application programs. The one or more application programs, when executed by the one or more processors, cause the electronic device to perform operations of the method for simulating a dynamic fluid effect as described in the first aspect of the present disclosure.

In a fourth aspect, a computer-readable medium is provided according to the present disclosure, which stores computer instructions. The computer instructions, when executed by a computer, cause the computer to perform the method for simulating a dynamic fluid effect as described in the first aspect of the present disclosure.

The technical solutions according to the present disclosure have the following beneficial effects. With the method and apparatus for simulating a dynamic fluid effect, the electronic device, and the readable medium according to the embodiments of the present disclosure, a first object and a fluid are displayed on a user display interface; a position of each of model particles in an object model corresponding to the first object is acquired; and a position of each of fluid particles corresponding to the fluid is acquired. When the first object collides with the fluid, for each of the fluid particles, the position of the fluid particle is adjusted based on a position of a model particle that collides with the fluid particle, to dynamically display a motion change of the fluid on the user display interface. With the technical solutions according to the present disclosure, the first object is modeled and each particle in the model is acquired, and when the first object collides with the fluid, the position of the fluid particle is adjusted based on the position of the model particle that collides with the fluid particle, so that it is unnecessary to calculate the SDF of the first object, thereby simplifying the calculation process and reducing the time consumption, thus saving computing and storage resources. In this way, the motion change effect of the fluid can be presented in real time on the mobile terminal.

BRIEF DESCRIPTION OF THE DRAWINGS

In order to illustrate the technical solutions in the embodiments of the present disclosure more clearly, drawings used in the description of the embodiments of the present disclosure are briefly described in the following.

DETAILED DESCRIPTION OF THE EMBODIMENTS

Figure 1:
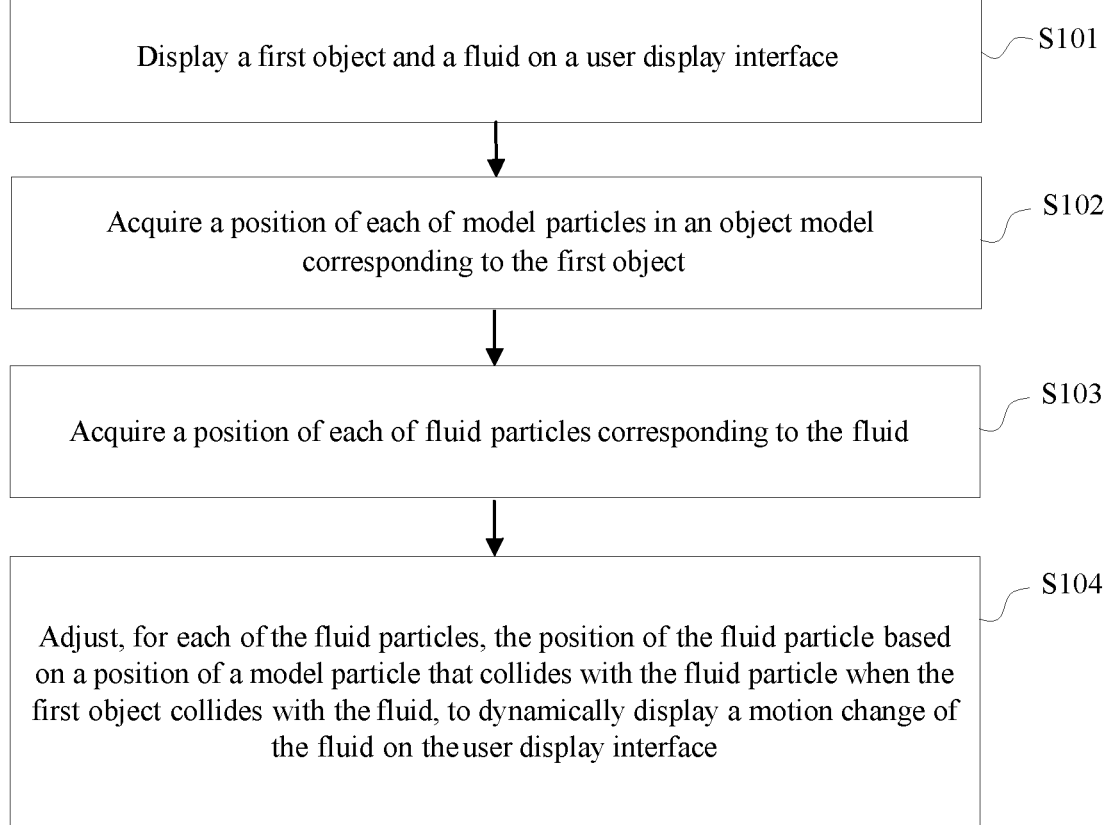
FIG. 1 is a flowchart of a method for simulating a dynamic fluid effect according to an embodiment of the present disclosure.

Embodiments of the present disclosure will be described in more detail below with reference to the drawings. Although some embodiments of the present disclosure are shown in the drawings, it is to be understood that the present disclosure may be implemented in various forms, and should not be interpreted as limited to the embodiments described herein. On the contrary, these embodiments are provided for a more thorough and complete understanding of the present disclosure. It is to be understood that the drawings and embodiments of the present disclosure are only for illustrative purposes and are not intended to limit the protection scope of the present disclosure.

It is to be understood that the various steps described in the method embodiments of the present disclosure may be performed in different orders and/or in parallel. Furthermore, a method embodiment may include additional steps and/or omit some illustrated steps. The scope of the present disclosure is not limited in this regard.

The term "including" and variations thereof herein are non-inclusive, that is, "including but not limited to". The term "based on" means "based at least in part on." The term "one embodiment" means "at least one embodiment". The term "another embodiment" means "at least one another embodiment". The term "some embodiments" means "at least some embodiments". Relevant definitions of other terms will be given in the description below.

It is to be noted that the terms "first", "second" and the like used in the present disclosure are only used to distinguish different devices, modules or units, and are not intended to define that these devices, modules or units are different devices, modules or units, and also are not intended to define the order or interdependence of functions performed by these devices, modules or units.

It is to be noted that the terms "one" and "multiple" used in the present disclosure are schematic rather than restrictive, and those skilled in the art should understand that, unless otherwise explicitly pointed out in the context, these terms should be understood as "one or more".

The names of messages or information transmitted between multiple devices in the embodiment of the present disclosure are only used for illustrative purposes, and are not used to limit the scope of these messages or information.

The technical solutions of the present disclosure and how to solve the above described technical problems with the technical solutions of the present disclosure will be described in detail below with reference to the embodiments. The following specific embodiments may be combined with each other, and the same or similar concepts or processes may not be repeated in some embodiments. The embodiments of the present disclosure will be described below with reference to the drawings.

The technical solutions of the present disclosure may be applied to application programs involving production, application, and usage of dynamic fluid effects. The technical solutions of the present disclosure may be applied to terminal devices, which may include, for example, smart phones, PDAs, tablet computers, wearable devices with display screens, and computer devices which include, for example, desktop computers, notebook computers, all-in-one computers, and smart TVs. With the technical solutions of the present disclosure, the first object and the fluid are modeled in a three-dimensional space, and an effect image obtained by rendering the object model and the fluid model is projected on the two-dimensional user display interface for display (for the sake of brevity, hereinafter, the model rendering effect image of the first object displayed in the user display interface is abbreviated as "the first object", and similarly, the model rendering effect image of the fluid displayed in the user display interface is abbreviated as "the fluid"). The first object may contact with the fluid in the interface. For example, the first object contains the fluid. When the first object moves under an external force, the fluid contained therein will move accordingly. When the first object collides with the fluid, motion change of the fluid is dynamically displayed on the user display interface. For example, the fluid is outside the first object, and when the fluid moves under an external force, the fluid collides with the first object, and the motion change of the fluid is dynamically displayed on the user display interface. It is to be understood by those skilled in the art that the present disclosure does not limit the positions and motions of the first object and the fluid.

FIG. 1 is a schematic flowchart of a method for simulating a dynamic fluid effect according to an embodiment of the present disclosure. As shown in FIG. 1, the method may include the following steps S101 to S104.

In step S101, a first object and a fluid are displayed on a user display interface. The user display interface may be a display interface in an application program, and the solutions according to the embodiments of the present disclosure may be implemented as an application program or a function plug-in of an application program. When a terminal device detects a startup instruction of a user for an application program, the application program is started and the user display interface is displayed. Alternatively, when the terminal device detects a triggering instruction of a user for a function plug-in of an application program (for example, clicking on a virtual button), the user display interface is displayed, where the user display interface displays images of the first object and the fluid. In an embodiment, the terminal device may model the first object and the fluid in a three-dimensional space, and project an effect image obtained by rendering the object model and the fluid model on a two-dimensional user display interface, to display the first object and the fluid on the user display interface.

The first object may be an object whose shape and volume are stable during motion and under a force, for example, a rigid body, and a soft body. The first object may contact with the fluid on the interface, for example, the fluid may be contained in the first object, and when the first object moves, the fluid contained therein moves accordingly, presenting a dynamic effect.

In step S102, a position of each of model particles in an object model corresponding to the first object is acquired.

Specifically, the terminal device may model the first object, process the object model obtained by modeling into the model particles, and acquire the position of each of the model particles. The position of each of the model particles includes: a position of the object model in a static state; and a position of each model particle during motion.

The terminal device process the object model of the first object into the form of particles, process the fluid into the form of particles, and converting a collision between the fluid and the first object into a collision between model particles and fluid particles, so as to simulate an effect of the collision between the object model and the fluid. Compared with the method of simulating an effect of a collision by calculating the SDF of the object model in the conventional art, the calculation steps are reduced, so that the calculation efficiency is improved, the calculation process is simplified and time consumption is reduced, thereby saving the calculation and storage resources.

In a possible implementation, the acquiring a position of each of model particles in an object model corresponding to the first object includes:

modeling the first object, to obtain the object model corresponding to the first object;

acquiring point cloud data of the object model; and determining, based on the point cloud data, the position of each of the model particles.

In practice, the terminal device models the first object in a three-dimensional space, acquires a three-dimensional object model corresponding to the first object, and exports the object model as point cloud data through a three-dimensional modeling software (for example, 3Dmax, and Maya). The point cloud data is in a point cloud format (for example, a suffix of a file in the point cloud format is .ply), each piece of point cloud data corresponds to a model particle, and includes a position and normal information the model particle in the model, and the normal information may represent a direction pointing to the outside of the object model.

In step S103, a position of each of fluid particles corresponding to the fluid is acquired.

When the fluid moves, the motion of the fluid is simulated based on the magnitude of an external force, a position of each of the fluid particles after the motion is estimated, to obtained an estimated position, and the estimated position is determined as a position of the fluid particle corresponding to the fluid. In an embodiment, the terminal device may calculate the estimated position of each fluid particle by a PBF method.

In step S104, when the first object collides with the fluid, the position of each of the fluid particles is adjusted based on a position of a model particle that collides with the fluid particle, to dynamically display a motion change of the fluid on the user display interface.

When the fluid or the first object moves on the user interface, all or a part of the fluid particles in the fluid will collide with the model particles of the first object. For a fluid particle that collides with a model particle, a position of the fluid particle is adjusted based on the position of the model particle that collides with the fluid particle, and the adjusted position is determined as the position of the fluid particle displayed on the user display interface. Therefore, the motion change process of the fluid particle that collides with the model particle displayed on the user display interface may include: moving from a position before motion to the adjusted position, where the adjusted position is obtained by adjusting the estimated position of the fluid particle obtained in step S103 based on a position of the model particle that collides with the fluid particle.

In a possible implementation, the method further includes:

displaying, for each of fluid particles that do not collide with model particles, the fluid particle on the user display interface based on the estimated position of the fluid particle.

In practice, for a fluid particle that does not collide with a model particle, the terminal device acquires the estimated position based on a position of the fluid particle before motion of the fluid particle, and determines the estimated position as the position after motion of the fluid particle that is displayed on the user display interface. Therefore, the motion change process of the fluid particle displayed on the user display interface includes: moving from the position before motion to the estimated position.

For example, if positions of fluid particles in the fluid before motion is represented as A1 ($A1_1$, $A1_2$ . . . $A1_n$, n is the number of the fluid particles), for the fluid moving with the first object or moving by itself, the terminal device may estimate a position of the fluid after motion with the PBF method, to obtain estimated positions A2 ($A2_1$, $A2_2$ . . . $A2_n$) of fluid particles. When the first object collides with the fluid, a part of the fluid particles B ($B_j$ . . . $B_k$) collides with model particles, the terminal device may adjust the estimated position A2 ($A2_j$, $A2_{j+1}$ . . . $A2_k$) of this part of the fluid particles B, to obtain adjusted positions A3($A3_j$, $A3_{j+1}$ . . . $A3_k$), and the remaining part of the fluid particles C does not collide with the model particles. Therefore, the motion change process of this part of fluid particles B displayed on the user display interface includes: moving from A1 ($A1_j$, $A1_{j+1}$ . . . $A1_k$) to A3 ($A3_j$, $A3_{j+1}$ . . . $A3_k$), and the motion change process of the part of fluid particles C displayed on the user display interface includes: moving from positions A1 to corresponding estimated positions A2.

In a possible implementation, for each of the fluid particles, a model particle that collides with the fluid particle is determined by:

determining the model particle that collides with the fluid particle based on the position of the fluid particle and the position of each of the model particles.

In practice, if the first object displayed on the user display interface is in contact with the fluid, model particles are distributed around the fluid particles, and the terminal device may determine which model particles collide with fluid particles and which model particles do not collide with fluid particles based on the estimated positions of the fluid particles and the position of each model particle after motion.

In a possible implementation, for each of the fluid particles, the determining a model particle that collides with the fluid particle based on the position of the fluid particle and the position of each of the model particles includes:

determining a distance between the fluid particle and each of the model particles based on the position of the fluid particle and the position of each of the model particles;

determining a model particle closest to the fluid particle as an adjacent model particle of the fluid particle; and determining that the adjacent model particle collides with the fluid particle if the distance between the adjacent model particle and the fluid particle is less than a preset distance.

In practice, for each of the fluid particles, a distance between a fluid particle and each of the model particles may be calculated based on the position of the fluid particle and the position of each of the model particles, and an adjacent model particle of the fluid particle may be determined based on the distance between the particles, and a model particle closest to the fluid particle is determined as the adjacent model particle of the fluid particle. The adjacent model particle of the fluid particle is most likely to collide with the fluid particle. In an embodiment, if the distance between the adjacent model particle and the fluid particle is less than the preset distance r, the adjacent model particle collides with the fluid particle, and the position of the model particle that collides with the fluid particle is obtained.

In a possible implementation, the adjusting the position of the fluid particle based on the position of the model particle that collides with the fluid particle, includes:

determining, for each of fluid particles that collide with model particles, a position correction amount of the fluid particle based on the position of the fluid particle and the position of the model particle that collides with the fluid particle;

adjusting the position of the fluid particle based on the position correction amount, to obtain an adjusted position of the fluid particle; and controlling, based on the adjusted position, a motion of the fluid particle in the fluid that collide with the model particles, to dynamically display a motion change of the fluid on the user display interface.

In practice, if the fluid collides with the object model, the positions of some or all of the fluid particles in the fluid may change due to the collision. Therefore, the positions of these fluid particles are no longer the estimated positions obtained when simulating the fluid motion, and the positions of these particles need to be adjusted. For each fluid particle that collides with a model particle, the position of the fluid particle and the position of the model particle that collides with the fluid particle may be represented as vectors in the three-dimensional space, and the terminal device may calculate a difference between the two vectors, and determine the position correction amount of the fluid particle based on the difference between the two vectors, and the terminal device adjusts the position of the fluid particle subjecting to collision based on the position correction amount, determines the adjusted position as a position of the fluid particle after collision, and displays that the fluid particle moves from the position before motion to the adjusted position on the user display interface, so that the dynamic change effect of the fluid is presented on the user display interface.

In a possible implementation, for each fluid particle that collides with a model particle, the determining a position correction amount of the fluid particle based on the position of the fluid particle and the position of the model particle that collides with the fluid particle, includes:

acquiring normal information of the model particle that collides with the fluid particle;

acquiring a first weight corresponding to the normal information, and a second weight corresponding to a first distance between the fluid particle and the model particle that collides with the fluid particle; and determining the position correction amount of the fluid particle based on the first distance, the normal information, the first weight, the second weight, and the preset distance r for determining whether the fluid particle collides with the adjacent particle.

In practice, the terminal device exports the object model as point cloud data. Each piece of point cloud data corresponds to a model particle. In addition to the position of each model particle in the model, the point cloud data further includes normal information of each model particle. Each piece of normal information may represent a direction pointing to the outside of the object model. The terminal device may preset a first weight and a second weight, where the first weight corresponds to the normal information of the model particle that collides with the fluid particle, and the second weight corresponds to a distance between the fluid particle and the model particle that collides with the fluid particle. The terminal device determines the position correction amount of the fluid particle based on the distance between the fluid particle and the model particle that collides with the fluid particle, the normal information, the first weight, the second weight and the preset distance.

In an embodiment, by modeling the first object to obtain an object model and exporting the object model as point cloud data, the position and normal information of the model particle in the model (which is also referred to as a model coordinate system) may be obtained. In order to calculate the position correction amount of the fluid particle, coordinate transformation may be performed on the position and normal information of the model particle, to transform the position and normal information of the model particle into a coordinate system for calculating the position correction amount of the fluid particle (which is also referred to as a fluid coordinate system). Coordinate transformation of model particle may be performed according to the following equations (1)-(2):

$$P_\omega = RP_m + T \tag{1}$$

$$n_\omega = Rn_m \tag{2}$$

where $P_\omega$ represents a position of each of the model particles in the fluid coordinate system; $P_m$ represents a position of each of the model particles in the model coordinate system; $n_\omega$ represents a normal vector of each of the model particle in the fluid coordinate system; $n_m$ represents a normal vector of each of the model particles in the model coordinate system vector; R represents a rotation matrix, T represents a translation vector, and R, T may be preset according to actual needs.

After converting the position and normal information of each of the model particles into the fluid coordinate system, the position correction amount of the fluid particle is calculated according to the following equations (3)-(4):

$$\Delta p = (r - \|d\|) * \text{abs}(n_\omega \cdot d) * (-\omega_1 n_\omega + \omega_2 d) \tag{3}$$

$$d = p - x \tag{4}$$

where $\Delta p$ represents a position correction amount to be calculated, r represents a preset distance, d represents a difference between position vectors of a fluid particle and a model particle that collides with the fluid particle in a three-dimensional space, $\|d\|$ represents a distance between position vectors of a fluid particle and a model particle that collides with the fluid particle in a three-dimensional space, that is, a norm of d, which represents a length of the vector, p represents a position vector of the position of the fluid particle, X represents a position vector of the position of the model particle that collides with the fluid particle; $n_p$ represents a normal vector of the model particle that collides with the fluid particle, $\omega_1$ represents a first weight, $\omega_2$ represents a second weight, and abs( ) represents an absolute value function. According to the above equations (3) and (4), the position correction amount $\Delta p$ of the fluid particle that collides with the first object may be obtained.

After acquiring the position correction amount $\Delta p$ of the fluid particle that collides with the model particle, the terminal device may adjust the position of the fluid particle that collides with the model particle based on the position correction amount $\Delta p$ according to the following equation (5):

$$p^{t+1}=p^t+\Delta p \qquad (5)$$

where $p^t$ represents a position of the fluid particle before position adjustment (for example, an estimated position obtained by the PBF method), $\Delta p$ represents the position correction amount, $p^{t+1}$ represents a position of the fluid particle after position adjustment, t represents a time before the position adjustment, t+1 represents a time after position adjustment.

With the method for simulating a dynamic fluid effect according to the embodiment of the present disclosure, a first object and a fluid are displayed on a user display interface; a position of each of model particles in an object model corresponding to the first object is acquired; and a position of each of fluid particles corresponding to the fluid is acquired. When the first object collides with the fluid, for each of the fluid particles, the position of the fluid particle is adjusted based on a position of a model particle that collides with the fluid particle, to dynamically display a motion change of the fluid on the user display interface. With the technical solutions according to the present disclosure, the first object is modeled and each particle in the model is acquired, and when the first object collides with the fluid, the position of the fluid particle is adjusted based on the position of the model particle that collides with the fluid particle, so that it is unnecessary to calculate the SDF of the first object, thereby simplifying the calculation process and reducing the time consumption, thus saving computing and storage resources. In this way, the motion change effect of the fluid can be presented in real time on the mobile terminal.

Figure 2:
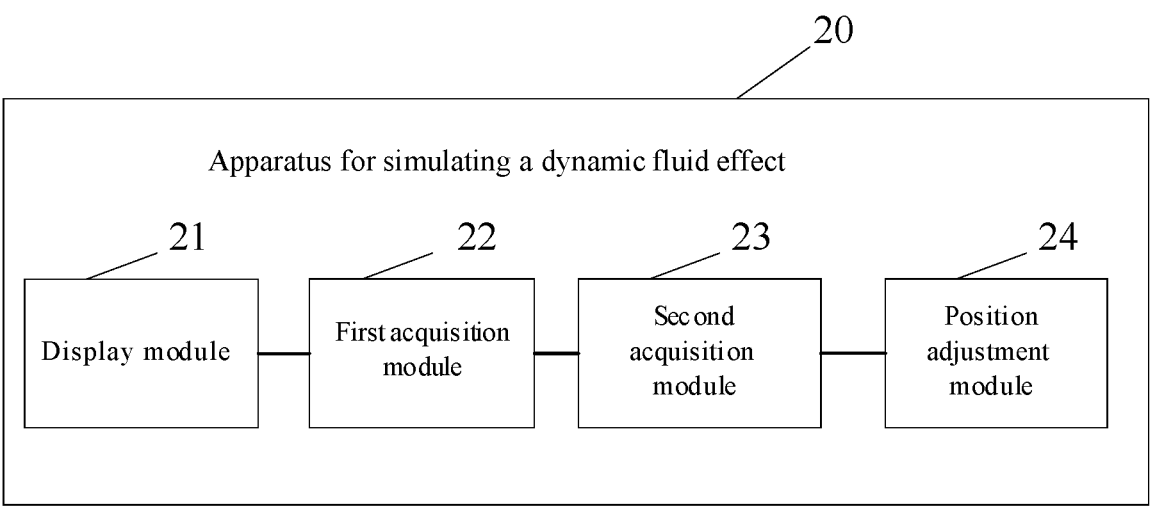
FIG. 2 is a schematic structural diagram of an apparatus for simulating a dynamic fluid effect according to an embodiment of the present disclosure.

Based on the same principle as the method shown in FIG. 1, an apparatus 20 for simulating a dynamic fluid effect is further provided according to an embodiment of the present disclosure, as shown in FIG. 2, the apparatus 20 for simulating a dynamic fluid effect may include: a display module 21, a first acquisition module 22, a second acquisition module 23, and a position adjustment module 24. The display module 21 is configured to display a first object and a fluid in a user display interface. The first acquisition module 22 is configured to acquire a position of each of model particles in an object model corresponding to the first object. The second acquisition module 23 is configured to acquire a position of each of fluid particles corresponding to the fluid. The position adjustment module 24 is configured to adjust, for each of the fluid particles, the position of the fluid particle based on a position of a model particle that collides with the fluid particle when the first object collides with the fluid, to dynamically display a motion change of the fluid on the user display interface.

In a possible implementation, for each of the fluid particles, the position adjustment module 24 may determine a model particle that collides with the fluid particle by:

determining the model particle that collides with the fluid particle based on the position of the fluid particle and the position of each of the model particles.

In a possible implementation, for each of the fluid particles, when determining the model particle that collides with the fluid particle based on the position of the fluid particle and the position of each of the model particles, the position adjustment module 24 is configured to:

determine a distance between the fluid particle and each of the model particles based on the position of the fluid particle and the position of each of the model particles;

determine a model particle closest to the fluid particle as an adjacent model particle of the fluid particle; and determine that the adjacent model particle collides with the fluid particle if a distance between the adjacent model particle and the fluid particle is less than a preset distance.

In a possible implementation, the position adjustment module 24 includes a determination unit, an adjustment unit and a control unit. The determination unit is configured to determine, for each of fluid particles that collide with model particles, a position correction amount of the fluid particle based on the position of the fluid particle and the position of the model particle that collides with the fluid particle. The adjustment unit is configured to adjust the position of the fluid particle based on the position correction amount, to obtain an adjusted position of the fluid particle. The control unit is configured to control, based on the adjusted position, motion of the fluid particle in the fluid that collides with the model particle, to dynamically display a motion change of the fluid on the user display interface.

In a possible implementation, the determination unit is further configured to:

acquire, for each of fluid particles that collide with model particles, normal information of the model particle that collides with the fluid particle;

acquire a first weight corresponding to the normal information, and a second weight corresponding to a first distance between the fluid particle and the model particle that collides with the fluid particle; and determine the position correction amount of the fluid particle based on the first distance, the normal information, the first weight, the second weight, and the preset distance.

In a possible implementation, the display module 21 is further configured to:

display, for each of fluid particles that do not collide with model particles, the fluid particle on the user display interface based on the position of the fluid particle.

In a possible implementation, the first acquisition module 22 is further configured to:

model the first object, to obtain the object model corresponding to the first object;

acquire point cloud data of the object model; and determine the position of each of the model particles based on the point cloud data.

The apparatus for simulating a dynamic fluid effect according to the embodiments of the present disclosure can execute the method for simulating a dynamic fluid effect according to the embodiments of the present disclosure, and the implementation principle is similar to that of the method. The operations executed by the modules of apparatus for simulating a dynamic fluid effect according to the embodiments of the present disclosure correspond to the steps of the method for simulating a dynamic fluid effect according to the embodiments of the present disclosure. For detailed description of functions of the modules of apparatus for simulating a dynamic fluid effect, reference may be made to the description of the method for simulating a dynamic fluid effect described above, which is not repeated here.

With the apparatus for simulating a dynamic fluid effect according to the embodiment of the present disclosure, a first object and a fluid are displayed on a user display interface; a position of each of model particles in an object model corresponding to the first object is acquired; and a position of each of fluid particles corresponding to the fluid is acquired. When the first object collides with the fluid, for each of the fluid particles, the position of the fluid particle is adjusted based on a position of a model particle that collides with the fluid particle, to dynamically display a motion change of the fluid on the user display interface. With the technical solutions according to the present disclosure, the first object is modeled and each particle in the model is acquired, and when the first object collides with the fluid, the position of the fluid particle is adjusted based on the position of the model particle that collides with the fluid particle, so that it is unnecessary to calculate the SDF of the first object, thereby simplifying the calculation process and reducing the time consumption, thus saving computing and storage resources. In this way, the motion change effect of the fluid can be presented in real time on the mobile terminal.

Figure 3:
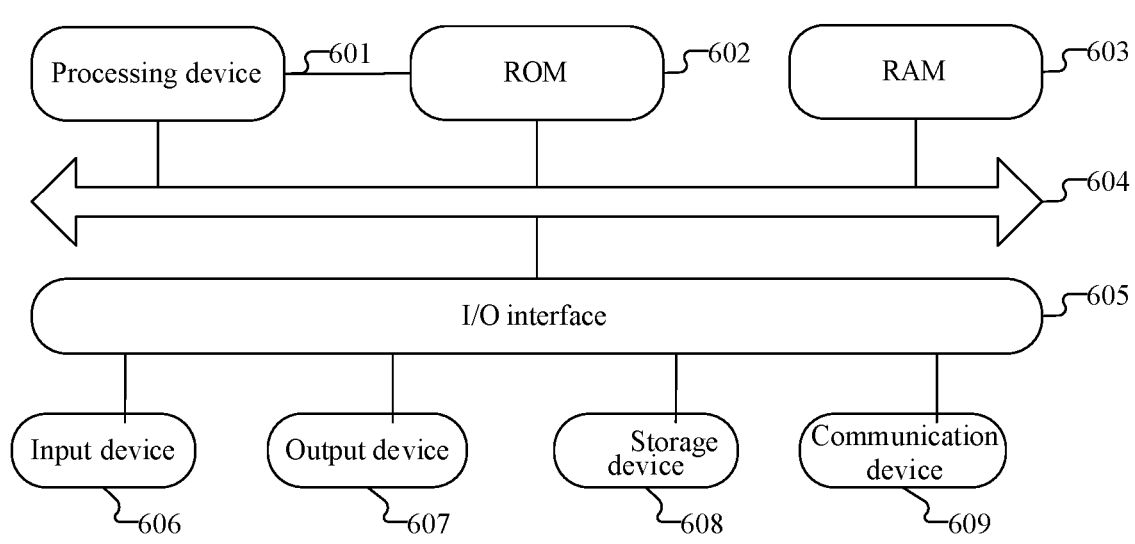
FIG. 3 is a schematic structural diagram of an electronic device according to an embodiment of the present disclosure.

Next, reference is made to FIG. 3, which is a schematic structural diagram of an electronic device 600 suitable for implementing an embodiment of the present disclosure. The executive body of the technical solutions of the embodiments of the present disclosure may include, but is not limited to, mobile terminals such as mobile phones, notebook computers, digital broadcast receivers, personal digital assistants (PDAs), tablets (PADs), portable multimedia players (PMPs), vehicle-mounted terminals (such as in-vehicle navigation terminals), wearable electronic devices, and stationary terminals such as digital TVs, desktop computers. The electronic device shown in FIG. 3 is only an example, and should not impose any limitation on the function and use scope of the embodiments of the present disclosure.

The electronic device includes: a memory and a processor, where the memory is configured to store a program for performing the methods described in the above method embodiments. The processor is configured to execute the program stored in the memory, to implement functions in the above-described embodiments of the present disclosure and/or other desired functions. The processor here may be referred to as a processing device 601 described below, and the memory may include at least one of a read-only memory (ROM) 602, a random access memory (RAM) 603, and a storage device 608 which are described specifically as follows.

As shown in FIG. 3, the electronic device 600 may include a processing device 601 (for example, a central processor, a graphics processor, and the like), which may perform various appropriate actions and processing according to programs stored in a read-only memory (ROM) 602 or programs loaded into a random access memory (RAM) 603 from a storage device 608. In the RAM 603, various programs and data required for the operation of the electronic device 600 are also stored. The processing device 601, the ROM 602 and the RAM 603 are connected to each other through a bus 604. The input/output (I/O) interface 605 is also connected to the bus 604.

Generally, the following devices may be connected to the I/O interface 605: an input device 606 including, for example, a touch screen, a touch pad, a keyboard, a mouse, a camera, a microphone, an accelerometer, a gyroscope, and the like; an output device 607 including, for example, a liquid crystal display (LCD), a loudspeaker, a vibrator, and the like; a storage device 608 including, for example, a tape, a hard disk, and the like; and a communication device 609. The communication device 609 may allow electronic device 600 to communicate wirelessly or wirelessly with other devices to exchange data. Although FIG. 3 shows an electronic device 600 with various devices, it is to be understood that it is unnecessary to implement or have all the devices shown. Alternatively, more or fewer devices may be implemented or provided.

Specifically, according to some embodiments of the present disclosure, the process described above with reference to the flowchart may be implemented as a computer software program. For example, an embodiment of the present disclosure provides a computer program product, which includes a computer program stored on a non-transitory computer-readable medium. The computer program includes program codes for executing the method in the embodiments. In such embodiments, the computer program may be downloaded and installed from the network through the communication device 609, or installed from the storage device 608, or installed from the ROM 602. When the computer program is executed by the processing device 601, the functions defined in the method of the embodiments of the present disclosure are executed.

It is to be noted that the computer readable storage medium according to the present disclosure may be a computer readable signal medium or a computer readable storage medium or a combination thereof. The computer readable storage medium may include, but is not limited to, a system, an apparatus, or a device in an electronic, magnetic, optical, electromagnetic, infrared, or semi-conductive form, or any combination thereof. Further, the computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the present disclosure, the computer readable storage medium may be any tangible medium containing or storing a program, and the program may be used by or in combination with an instruction execution system, apparatus, or device. In the present disclosure, the computer readable signal medium may include a data signal transmitted in a baseband or transmitted as a part of a carrier wave and carrying computer readable program codes. The transmitted data signal may be in various forms, including but not limited to an electromagnetic signal, an optical signal or a combination thereof. The computer readable signal medium may be any computer readable medium other than the computer readable storage medium, and can send, propagate or transmit programs to be used by or in combination with an instruction execution system, apparatus or device. The program codes stored in the computer readable medium may be transmitted via any proper medium including but not limited to a wire, an optical cable, radio frequency (RF) and the like, or any combination thereof.

In some embodiments, the client and the server may perform communication using any currently known or future developed network protocol such as HyperText Transfer Protocol (HTTP), and may be interconnected with a digital data communication (for example, a communication network) in any form or by any medium. Examples of the communication network include a local area network (LAN), a wide area network (WAN), the Internet Work (for example, the Internet), and a peer-to-peer network (for example, an ad hoc peer-to-peer network), as well as any currently known network or a future developed network.

The computer readable medium may be incorporated in the electronic device, or may exist alone without being assembled into the electronic device.

The computer readable medium carries one or more programs. The one or more programs, when executed by the electronic device, cause the electronic device to perform steps of: acquiring a position of each of model particles in an object model corresponding to a first object; acquiring a position of each of fluid particles corresponding to a fluid; and adjusting, for each of the fluid particles, the position of the fluid particle based on a position of a model particle that collides with the fluid particle when the first object collides with the fluid, to dynamically display a motion change of the fluid on the user display interface.

Computer program codes for performing operations of some embodiments of the present disclosure may be written in one or more programming languages or any combination thereof, including but not limited to object-oriented programming languages, such as Java, Smalltalk, C++, and conventional procedural programming languages, such as the "C" language or similar programming languages. The program codes may be executed entirely or partly on a computer of a user, executed as a stand-alone software package, executed partly on the computer of the user and partly on a remote computer, or entirely on the remote computer or server. In the case of a remote computer, the remote computer may be connected to the computer of the user through any kind of network, including a local area network (LAN) or a wide area network (WAN), or may be connected to an external computer (for example, via an Internet connection according to an Internet service provider).

The flowchart and block diagrams in the drawings illustrate the architecture, functionality, and operation of possible implementations of systems, methods and computer program products according to the embodiments of the present disclosure. In this regard, each block in the flowchart or block diagrams may represent a module, a segment, or a portion of code that contains executable instructions for implementing the specified logical functions. It is also to be noted that, in some alternative implementations, the functions noted in the blocks may be executed out of the order noted in the figures. For example, two blocks shown in succession may, in fact, be executed substantially concurrently, or may be executed in the reverse order, depending upon the functionality involved. It is also noted that each block of the block diagrams and/or flowchart illustrations, and combinations of blocks in the block diagrams and/or flowchart illustrations, can be implemented in dedicated hardware-based systems that perform the specified functions or operations, or may be implemented in a combination of dedicated hardware and computer instructions.

The modules or units described in some embodiments of the present disclosure may be implemented in software or hardware. The names of these modules or units do not constitute a definition of the unit itself in some cases.

The functions described herein above may be performed, at least in part, by one or more hardware logic components. For example, without limitation, exemplary types of hardware logic components that may be used include: Field Programmable Gate Arrays (FPGAs), Application Specific Integrated Circuits (ASICs), Application Specific Standard Products (ASSPs), Systems on Chips (SOCs), Complex Programmable Logical Devices (CPLDs) and the like.

In the context of the present disclosure, a machine-readable medium may be a tangible medium that may contain or store a program for use by or in connection with the instruction execution system, apparatus or device. The machine-readable medium may be a machine-readable signal medium or a machine-readable storage medium. The machine-readable medium may include, but is not limited to, systems, apparatuses, or devices in an electronic, magnetic, optical, electromagnetic, infrared, or semiconductor form, or any suitable combination thereof. Specific examples of the machine-readable storage medium may include an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof.

According to one or more embodiments of the present disclosure, a method for simulating a dynamic fluid effect is provided according to the present disclosure, which includes:

displaying a first object and a fluid on a user interface;

acquiring a position of each of model particles in an object model corresponding to the first object;

acquiring a position of each of fluid particles corresponding to the fluid; and adjusting, for each of the fluid particles, the position of the fluid particle based on a position of a model particle that collides with the fluid particle when the first object collides with the fluid, to dynamically display a motion change of the fluid on the user display interface.

In a possible implementation, for each of the fluid particles, a model particle that collides with the fluid particle is determined by:

determining the model particle that collides with the fluid particle based on the position of the fluid particle and the position of each of the model particles.

In a possible implementation, for each of the fluid particles, the determining the model particle that collides with the fluid particle based on the position of the fluid particle and the position of each of the model particles includes:

determining a distance between the fluid particle and each of the model particles based on the position of the fluid particle and the position of each of the model particles;

determining a model particle closest to the fluid particle as an adjacent model particle of the fluid particle; and determining that the adjacent model particle collides with the fluid particle if a distance between the adjacent model particle and the fluid particle is less than a preset distance.

In a possible implementation, the adjusting the position of each of the fluid particles based on the position of the model particle that collides with the fluid particle includes:

determining, for each of fluid particles that collide with model particles, a position correction amount of the fluid particle based on the position of the fluid particle and the position of the model particle that collides with the fluid particle;

adjusting the position of the fluid particle based on the position correction amount, to obtain an adjusted position of the fluid particle; and controlling, based on the adjusted position, a motion of the fluid particle in the fluid that collides with the model particle, to dynamically display a motion change of the fluid on the user display interface.

In a possible implementation, the determining, for each of fluid particles that collide with model particles, a position correction amount of the fluid particle based on the position of the fluid particle and the position of the model particle that collides with the fluid particle includes:

acquiring normal information of the model particle that collides with the fluid particle;

acquiring a first weight corresponding to the normal information, and a second weight corresponding to a first distance between the fluid particle and the model particle that collides with the fluid particle; and determining the position correction amount of the fluid particle based on the first distance, the normal information, the first weight, the second weight, and the preset distance.

In a possible implementation, the acquiring a position of each of model particles in an object model corresponding to the first object includes:

modeling the first object, to obtain the object model corresponding to the first object;

acquiring point cloud data of the object model; and determining the position of each of the model particles based on the point cloud data.

In a possible implementation, the method further includes:

displaying, for each of fluid particles that do not collide with model particles, the fluid particle on the user display interface based on the position of the fluid particle.

According to one or more embodiments of the present disclosure, an apparatus for simulating a dynamic fluid effect is provided according to the present disclosure, which includes: a display module, a first acquisition module, a second acquisition module, and a position adjustment module. The display module is configured to display a first object and a fluid on a user display interface. The first acquisition module is configured to acquire a position of each of model particles in an object model corresponding to the first object. The second acquisition module is configured to acquire a position of each of fluid particles corresponding to the fluid. The position adjustment module is configured to adjust, for each of the fluid particles, the position of the fluid particle based on a position of a model particle that collides with the fluid particle when the first object collides with the fluid, to dynamically display a motion change of the fluid on the user display interface.

In a possible implementation, for each of the fluid particles, the position adjustment module may determine a model particle that collides with the fluid particle by:

determining the model particle that collides with the fluid particle based on the position of the fluid particle and the position of each of the model particles.

In a possible implementation, for each of the fluid particles, when determining the model particle that collides with the fluid particle based on the position of the fluid particle and the position of each of the model particles, the position adjustment module is configured to:

determine a distance between the fluid particle and each of the model particles based on the position of the fluid particle and the position of each of the model particles;

determine a model particle closest to the fluid particle as an adjacent model particle of the fluid particle; and determine that the adjacent model particle collides with the fluid particle if a distance between the adjacent model particle and the fluid particle is less than a preset distance.

In a possible implementation, the position adjustment module includes a determination unit, an adjustment unit and a control unit. The determination unit is configured to determine, for each of fluid particles that collide with model particles, a position correction amount of the fluid particle based on the position of the fluid particle and the position of the model particle that collides with the fluid particle. The adjustment unit is configured to adjust the position of the fluid particle based on the position correction amount, to obtain an adjusted position of the fluid particle. The control unit is configured to control, based on the adjusted position, a motion of the fluid particle in the fluid that collides with the model particle, to dynamically display a motion change of the fluid on the user display interface.

In a possible implementation, the determination unit is further configured to:

acquire, for each of fluid particles that collide with model particles, normal information of the model particle that collides with the fluid particle;

acquire a first weight corresponding to the normal information, and a second weight corresponding to a first distance between the fluid particle and the model particle that collides with the fluid particle; and determine the position correction amount of the fluid particle based on the first distance, the normal information, the first weight, the second weight, and the preset distance.

In a possible implementation, the first acquisition module is further configured to:

model the first object, to obtain the object model corresponding to the first object;

acquire point cloud data of the object model; and determine the position of each of the model particles based on the point cloud data.

In a possible implementation, the display module is further configured to:

display, for each of fluid particles that do not collide with model particles, the fluid particle on the user display interface based on the position of the fluid particle.

According to one or more embodiments of the present disclosure, an electronic device is provided, which includes: one or more processors; and a memory configured to store one or more programs. The one or more programs, when executed by the one or more processors, cause the electronic device to perform the method for simulating a dynamic fluid effect.

According to one or more embodiments of the present disclosure, a computer-readable medium is provided, which has computer instructions stored thereon. The computer instructions, when executed by a computer, cause the computer to perform the method for simulating a dynamic fluid effect.

The above description merely illustrates the embodiments of the present disclosure and the used technical principles. Those skilled in the art should understand that the scope of present disclosure is not limited to the technical solutions formed by any combination of the above-mentioned technical features, and should also cover other technical solutions formed by any combination of the above-mentioned technical features and any equivalent features without departing from the above disclosed concept, for example, a technical solution formed by replacing the above features with the technical features disclosed in the embodiments of the present disclosure (but not limited to) with similar functions.

In addition, although operations are described in a particular order, this should not be construed as that the operations be performed in the particular order or in a sequential order. Under certain circumstances, multitasking and parallel processing may be advantageous. Further, although the above description contains several implementation-specific details, these should not be construed as limitations on the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combinations.

Although the subject matter has been described in language specific to structural features and/or logical acts of methods, it is to be understood that the subject matter defined in the claims is not necessarily limited to the specific features or acts described above. Rather, the specific features and acts described above are merely example forms of implementing the claims.

What is claimed is:

1. A method for simulating a dynamic fluid effect, comprising:

displaying a first object and a fluid on a user display interface;

acquiring a position of each model particle of a plurality of model particles in an object model corresponding to the first object;

acquiring a position of each fluid particle of a plurality of fluid particles corresponding to the fluid; and adjusting, for each fluid particle of the plurality of fluid particles, the position of the fluid particle based on a position of a model particle that collides with the fluid particle when the first object collides with the fluid, to dynamically display a motion change of the fluid on the user display interface;

wherein for each fluid particle of the plurality of fluid particles, the model particle that collides with the fluid particle is determined by:

determining the model particle that collides with the fluid particle based on the position of the fluid particle and the position of each model particle of the plurality of model particles, comprising:

determining a distance between the fluid particle and each model particle of the plurality of model particles based on the position of the fluid particle and the position of each model particle of the plurality of model particles;

determining a model particle closest to the fluid particle as an adjacent model particle of the fluid particle; and determining that the adjacent model particle collides with the fluid particle if a distance between the adjacent model particle and the fluid particle is less than a preset distance.

2. The method for simulating a dynamic fluid effect according to claim 1, wherein the adjusting, for each fluid particle of the plurality of fluid particles, the position of the fluid particle based on the position of the model particle that collides with the fluid particle comprises:

determining, for each fluid particle of the plurality of fluid particles that collides with the plurality of model particles, a position correction amount of the fluid particle based on the position of the fluid particle and the position of the model particle that collides with the fluid particle;

adjusting the position of the fluid particle based on the position correction amount, to obtain an adjusted position of the fluid particle; and controlling, based on the adjusted position, a motion of the fluid particle in the fluid that collides with the model particle, to dynamically display the motion change of the fluid on the user display interface.

3. The method for simulating a dynamic fluid effect according to claim 2, wherein determining, for each fluid particle of the plurality of fluid particles that collides with the plurality of model particles, the position correction amount of the fluid particle based on the position of the fluid particle and the position of the model particle that collides with the fluid particle comprises:

acquiring normal information of the model particle that collides with the fluid particle;

acquiring a first weight corresponding to the normal information, and a second weight corresponding to a first distance between the fluid particle and the model particle that collides with the fluid particle; and determining the position correction amount of the fluid particle based on the first distance, the normal information, the first weight, the second weight, and the preset distance.

4. The method for simulating a dynamic fluid effect according to claim 1, wherein acquiring the position of each model particle of the plurality of model particles in the object model corresponding to the first object comprises:

modeling the first object, to obtain the object model corresponding to the first object;

acquiring point cloud data of the object model; and determining the position of each model particle of the plurality of model particles based on the point cloud data.

5. The method for simulating a dynamic fluid effect according to claim 1, further comprising:

displaying, for each fluid particle of the plurality of fluid particles that does not collide with the plurality of model particles, the fluid particle on the user display interface based on the position of the fluid particle.

6. An apparatus for simulating a dynamic fluid effect, comprising:

at least one processor, and at least one memory communicatively coupled to the at least one processor and storing instructions that upon execution by the at least one processor cause the apparatus to:

display a first object and a fluid on a user display interface;

acquire a position of each model particle of a plurality of model particles in an object model corresponding to the first object;

acquire a position of each fluid particle of a plurality of fluid particles corresponding to the fluid; and adjust, for each fluid particle of the plurality of fluid particles, the position of the fluid particle based on a position of a model particle that collides with the fluid particle when the first object collides with the fluid, to dynamically display a motion change of the fluid on the user display interface;

wherein for each fluid particle of the plurality of fluid particles, the model particle that collides with the fluid particle is determined by:

determining the model particle that collides with the fluid particle based on the position of the fluid particle and the position of each model particle of the plurality of model particles, comprising:

determining a distance between the fluid particle and each model particle of the plurality of model particles based on the position of the fluid particle and the position of each model particle of the plurality of model particles;

determining a model particle closest to the fluid particle as an adjacent model particle of the fluid particle; and determining that the adjacent model particle collides with the fluid particle if a distance between the adjacent model particle and the fluid particle is less than a preset distance.

7. A computer-readable non-transitory medium, bearing computer-readable instructions that upon execution on a computing device cause the computing device at least to:

display a first object and a fluid on a user display interface;

acquire a position of each model particle of a plurality of model particles in an object model corresponding to the first object;

acquire a position of each fluid particle of a plurality of fluid particles corresponding to the fluid; and adjust, for each fluid particle of the plurality of fluid particles, the position of the fluid particle based on a position of a model particle that collides with the fluid particle when the first object collides with the fluid, to dynamically display a motion change of the fluid on the user display interface;

wherein for each fluid particle of the plurality of fluid particles, the model particle that collides with the fluid particle is determined by:

determining the model particle that collides with the fluid particle based on the position of the fluid particle and the position of each model particle of the plurality of model particles, comprising:

determining a distance between the fluid particle and each model particle of the plurality of model particles based on the position of the fluid particle and the position of each model particle of the plurality of model particles;

determining a model particle closest to the fluid particle as an adjacent model particle of the fluid particle; and determining that the adjacent model particle collides with the fluid particle if a distance between the adjacent model particle and the fluid particle is less than a preset distance.

8. The apparatus of claim 6, wherein the at least one memory further stores instructions that upon execution by the at least one processor cause the apparatus to:

determine, for each fluid particle of the plurality of fluid particles that collides with the plurality of model particles, a position correction amount of the fluid particle based on the position of the fluid particle and the position of the model particle that collides with the fluid particle;

adjust the position of the fluid particle based on the position correction amount, to obtain an adjusted position of the fluid particle; and control, based on the adjusted position, a motion of the fluid particle in the fluid that collides with the model particle, to dynamically display the motion change of the fluid on the user display interface.

9. The apparatus of claim 8, wherein the at least one memory further stores instructions that upon execution by the at least one processor cause the apparatus to:

acquire normal information of the model particle that collides with the fluid particle;

acquire a first weight corresponding to the normal information, and a second weight corresponding to a first distance between the fluid particle and the model particle that collides with the fluid particle; and determine the position correction amount of the fluid particle based on the first distance, the normal information, the first weight, the second weight, and the preset distance.

10. The apparatus of claim 6, wherein the at least one memory further stores instructions that upon execution by the at least one processor cause the apparatus to:

model the first object, obtain the object model corresponding to the first object;

acquire point cloud data of the object model; and determine the position of each model particle of the plurality of model particles based on the point cloud data.

11. The apparatus of claim 6, wherein the at least one memory further stores instructions that upon execution by the at least one processor cause the apparatus to:

display, for each fluid particle of the plurality of fluid particles that does not collide with the plurality of model particles, the fluid particle on the user display interface based on the position of the fluid particle.

* * * * *